United States Patent
Sztuk et al.

(10) Patent No.: US 11,778,366 B2
(45) Date of Patent: Oct. 3, 2023

(54) GAZE-GUIDED AUDIO

(71) Applicant: Meta Platforms Technologies, LLC, Menlo Park, CA (US)

(72) Inventors: Sebastian Sztuk, Menlo Park, CA (US); Salvael Ortega Estrada, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/521,293

(22) Filed: Nov. 8, 2021

(65) Prior Publication Data

US 2023/0148241 A1 May 11, 2023

(51) Int. Cl.
*H04R 1/22* (2006.01)
*G06F 3/01* (2006.01)
*H04R 1/10* (2006.01)
*H04R 1/08* (2006.01)

(52) U.S. Cl.
CPC ............ *H04R 1/222* (2013.01); *G06F 3/011* (2013.01); *H04R 1/08* (2013.01); *H04R 1/10* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 2013/0315404 A1* | 11/2013 | Goldfeder | H04R 3/005 381/92 |
| 2015/0063603 A1 | 3/2015 | Hen et al. | |
| 2015/0341734 A1* | 11/2015 | Sherman | H04R 29/005 381/92 |
| 2017/0277257 A1 | 9/2017 | Ota et al. | |
| 2019/0306618 A1 | 10/2019 | Sherman | |
| 2020/0296521 A1* | 9/2020 | Wexler | G06F 3/167 |
| 2022/0028406 A1* | 1/2022 | Burmistrov | G06F 3/011 |

OTHER PUBLICATIONS

International Search Report and Written Opinion for International Application No. PCT/US2022/049047, dated Mar. 9, 2023, 15 pages.

\* cited by examiner

*Primary Examiner* — Kenny H Truong
(74) *Attorney, Agent, or Firm* — FREESTONE INTELLECTUAL PROPERTY LAW PLLC; Aaron J. Visbeek (57) ABSTRACT

A gaze direction of a user is determined by an eye-tracking system of a head mounted device. Audio data generated by at least one microphone is captured. Gaze-guided audio is generated from the audio data based on the gaze direction of the user.

14 Claims, 9 Drawing Sheets

GAZE-GUIDED AUDIO

TECHNICAL FIELD

This disclosure relates generally to microphones, and in particular to capturing gaze-guided audio.

BACKGROUND INFORMATION

A head mounted device is a wearable electronic device, typically worn on the head of a user. Head mounted devices may include one or more electronic components for use in a variety of applications, such as gaming, aviation, engineering, medicine, entertainment, activity tracking, and so on. Head mounted devices may include one or more displays to present virtual images to a wearer of the head mounted device. When a head mounted device includes a display, it may be referred to as a head mounted display. Head mounted devices may include one or more microphones to capture audio data.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of capturing gaze-guided audio data are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light Implementations of devices, systems, and methods of capturing gaze-guided images are disclosed herein. In some implementations of the disclosure, a head mounted device includes an eye-tracking system that determines a gaze direction of an eye of a user of the head mounted device. Gaze-guided audio is generated from audio data based on the gaze direction where the audio data is captured by microphones of the head mounted device.

In some implementations, the gaze-guided audio is driven onto speakers of the head mounted device to present the gaze-guided audio to a user/wearer of the head mounted device. By way of example, a user of a head mounted device may be looking toward a waterfall that is in a right portion of a field of view (FOV) of a user. The gaze direction of the user can be used to amplify sound received by one or more microphones that is oriented to capture/receive sound (e.g. the sound of falling water) from the waterfall to the right of the user. The amplified audio data can then be provided to the ear of the user/wearer by speakers of the head mounted device. Thus, the user is able to enjoy enhanced listening to sounds generated from where the user is looking.

In some implementations, the gaze-guided audio is stored to a memory. The gaze-guided audio may be stored to memory as an audio portion of a video file that was captured by the head mounted device contemporaneously with the audio data, for example. This allows users to film videos that include sound from where the user is looking rather than adding ambient noise/sound from the entire external environment of the head mounted display. These and other implementations are described in more detail in connection with FIGS. 1-6.

Figure 1:
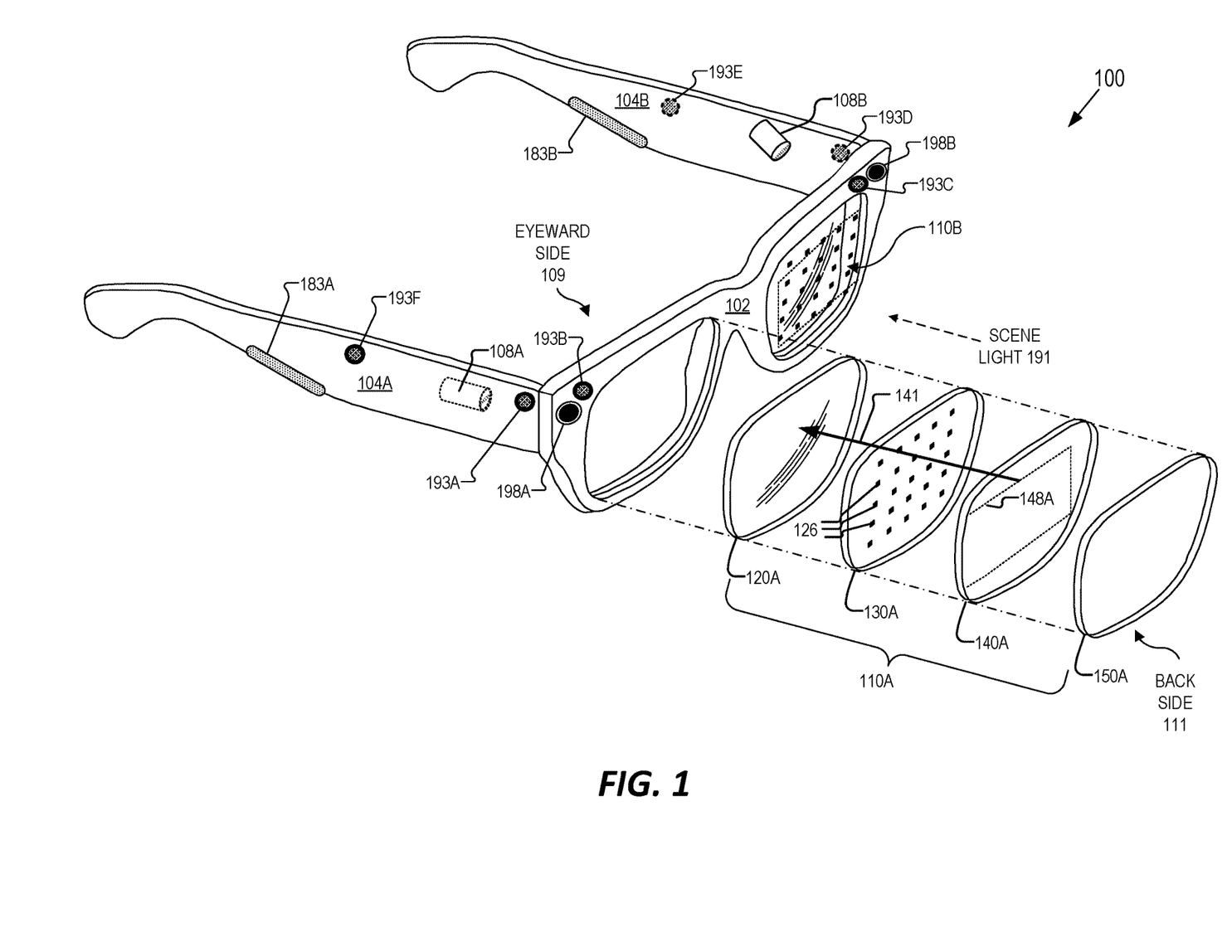
FIG. 1 illustrates an example head mounted device for capturing gaze-guided audio, in accordance with aspects of the present disclosure.

FIG. 1 illustrates an example head mounted device 100 for capturing gaze-guided audio, in accordance with aspects of the present disclosure. The illustrated example of head mounted device 100 is shown as including a frame 102, temple arms 104A and 104B, and near-eye optical elements 110A and 110B. Cameras 108A and 108B are shown as coupled to temple arms 104A and 104B, respectively. Cameras 108A and 108B may be configured to image an eyebox region to image the eye of the user to capture eye data of the user. Cameras 108A and 108B may be included in an eye-tracking system that is configured to determine a gaze direction of an eye (or eyes) of a user of the head mounted device. Cameras 108A and 108B may image the eyebox region directly or indirectly. For example, optical elements 110A and/or 110B may have an optical combiner (not specifically illustrated) that is configured to redirect light from the eyebox to the cameras 108A and/or 108B. In some implementations, near-infrared light sources (e.g. LEDs or vertical-cavity side emitting lasers) illuminate the eyebox region with near-infrared illumination light and cameras 108A and/or 108B are configured to capture infrared images for eye-tracking purposes. Cameras 108A and/or 108B may include complementary metal-oxide semiconductor (CMOS) image sensor. A near-infrared filter that receives a narrow-band near-infrared wavelength may be placed over the image sensor so it is sensitive to the narrow-band near-infrared wavelength while rejecting visible light and wavelengths outside the narrow-band. The near-infrared light sources (not illustrated) may emit the narrow-band wavelength that is passed by the near-infrared filters.

In addition to image sensors, various other sensors of head mounted device 100 may be configured to capture eye data that is utilized to determine a gaze direction of the eye (or eyes). Ultrasound or light detection and ranging (LIDAR) sensors may be configured in frame 102 to detect a position of an eye of the user by detecting the position of the cornea of the eye, for example. Discrete photodiodes included in frame 102 or optical elements 110A and/or 110B may also be used to detect a position of the eye of the user. Discrete photodiodes may be used to detect "glints" of light reflecting off of the eye, for example. Eye data generated by various sensors may not necessarily be considered "images" of the eye yet the eye-data may be used by an eye-tracking system to determine a gaze direction of the eye(s).

FIG. 1 also illustrates an exploded view of an example of near-eye optical element 110A. Near-eye optical element 110A is shown as including an optically transparent layer 120A, an illumination layer 130A, a display layer 140A, and a transparency modulator layer 150A. Display layer 140A may include a waveguide 148A that is configured to direct virtual images included in visible image light 141 to an eye of a user of head mounted device 100 that is in an eyebox region of head mounted device 100. In some implementations, at least a portion of the electronic display of display layer 140A is included in the frame 102 of head mounted device 100. The electronic display may include an LCD, an organic light emitting diode (OLED) display, micro-LED display, pico-projector, or liquid crystal on silicon (LCOS) display for generating the image light 141.

When head mounted device 100 includes a display, it may be considered a head mounted display. Head mounted device 100 may be considered an augmented reality (AR) head mounted display. While FIG. 1 illustrates a head mounted device 100 configured for augmented reality (AR) or mixed reality (MR) contexts, the disclosed implementations may also be used in other implementations of a head mounted display such as virtual reality head mounted displays. Additionally, some implementations of the disclosure may be used in a head mounted device that does not include a display.

Illumination layer 130A is shown as including a plurality of in-field illuminators 126. In-field illuminators 126 are described as "in-field" because they are in a field of view (FOV) of a user of the head mounted device 100. In-field illuminators 126 may be in a same FOV that a user views a display of the head mounted device 100, in an implementation. In-field illuminators 126 may be in a same FOV that a user views an external environment of the head mounted device 100 via scene light 191 propagating through near-eye optical elements 110. Scene light 191 is from the external environment of head mounted device 100. While in-field illuminators 126 may introduce minor occlusions into the near-eye optical element 110A, the in-field illuminators 126, as well as their corresponding electrical routing may be so small as to be unnoticeable or insignificant to a wearer of head mounted device 100. In some implementations, illuminators 126 are not in-field. Rather, illuminators 126 could be out-of-field in some implementations.

As shown in FIG. 1, frame 102 is coupled to temple arms 104A and 104B for securing the head mounted device 100 to the head of a user. Example head mounted device 100 may also include supporting hardware incorporated into the frame 102 and/or temple arms 104A and 104B. The hardware of head mounted device 100 may include any of processing logic, wired and/or wireless data interface for sending and receiving data, graphic processors, and one or more memories for storing data and computer-executable instructions. In one example, head mounted device 100 may be configured to receive wired power and/or may be configured to be powered by one or more batteries. In addition, head mounted device 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent or semi-transparent to the user to facilitate augmented reality or mixed reality such that the user can view visible scene light from the environment while also receiving image light 141 directed to their eye(s) by way of display layer 140A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, or micro-LED display, etc.) incorporated in the virtual reality headset.

As shown in FIG. 1, illumination layer 130A includes a plurality of in-field illuminators 126. Each in-field illuminator 126 may be disposed on a transparent substrate and may be configured to emit light to an eyebox region on an eyeward side 109 of the near-eye optical element 110A. In some aspects of the disclosure, the in-field illuminators 126 are configured to emit near infrared light (e.g. 750 nm-1.6 μm). Each in-field illuminator 126 may be a micro light emitting diode (micro-LED), an edge emitting LED, a vertical cavity surface emitting laser (VCSEL) diode, or a Superluminescent diode (SLED).

Optically transparent layer 120A is shown as being disposed between the illumination layer 130A and the eyeward side 109 of the near-eye optical element 110A. The optically transparent layer 120A may receive the infrared illumination light emitted by the illumination layer 130A and pass the infrared illumination light to illuminate the eye of the user in an eyebox region of the head mounted device. As mentioned above, the optically transparent layer 120A may also be transparent to visible light, such as scene light 191 received from the environment and/or image light 141 received from the display layer 140A. In some examples, the optically transparent layer 120A has a curvature for focusing light (e.g., display light and/or scene light) to the eye of the user. Thus, the optically transparent layer 120A may, in some examples, be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens.

Head mounted device 100 includes at least one camera for generating one or more images. The images may be saved as photos or video files to a memory of the head mounted device. In the particular illustrated example of FIG. 1, head mounted device includes cameras 198A and 198B. Cameras 198A and 198B may include a lens assembly configured to focus image light onto a complementary metal-oxide semiconductor (CMOS) image sensor. The lens assemblies may include optical zoom and auto-focus features. In the illustrated implementation, camera 198A is configured to image the external environment to the forward-right of head mounted device 100 and camera 198B is configured to image the forward-left of the external environment of head mounted device 100. The field of view (FOV) of camera 198A may overlap a FOV of camera 198B.

Head mounted device 100 also includes one or more microphones for generating gaze-guided audio data. In the illustration of FIG. 1, head mounted device 100 includes microphones 193A, 193B, 193C, 193D, 193E, and 193F (collectively referred to as microphones 193). Head mounted device 100 may include a single microphone or integer n number microphones, in various implementations. Microphone 193B is located in the upper-right corner of frame 102 and may be oriented to receive sound waves originating from a particular audio zone in front of head mounted device 100. Microphone 193C is located in the upper-left corner of frame 102 and may be oriented to receive sound waves originating from a particular audio zone in front of head mounted device 100. Microphones 193A and 193F may be oriented to receive sound waves from the right side of head mounted device 100 and microphones 193D and 193E may be oriented to receive sound wave from the left side of head mounted device 100.

Head mounted device 100 also includes speakers 183A and 183B. Speakers 183A and 183B are illustrated in an example position to present audio to the ear of a user/wearer of head mounted device 100, in FIG. 1. Gaze-guided audio may be driven onto speakers 183 to enhance the listening of users of head mounted device 100 with respect to where the user is looking. There may be more or fewer speakers in head mounted device 100. The speaker(s) may be positioned in alternative positions to the specific illustration of FIG. 1. In some implementations, bone conduction headphones are used to present the gaze-guided audio to the user.

Figure 2A:
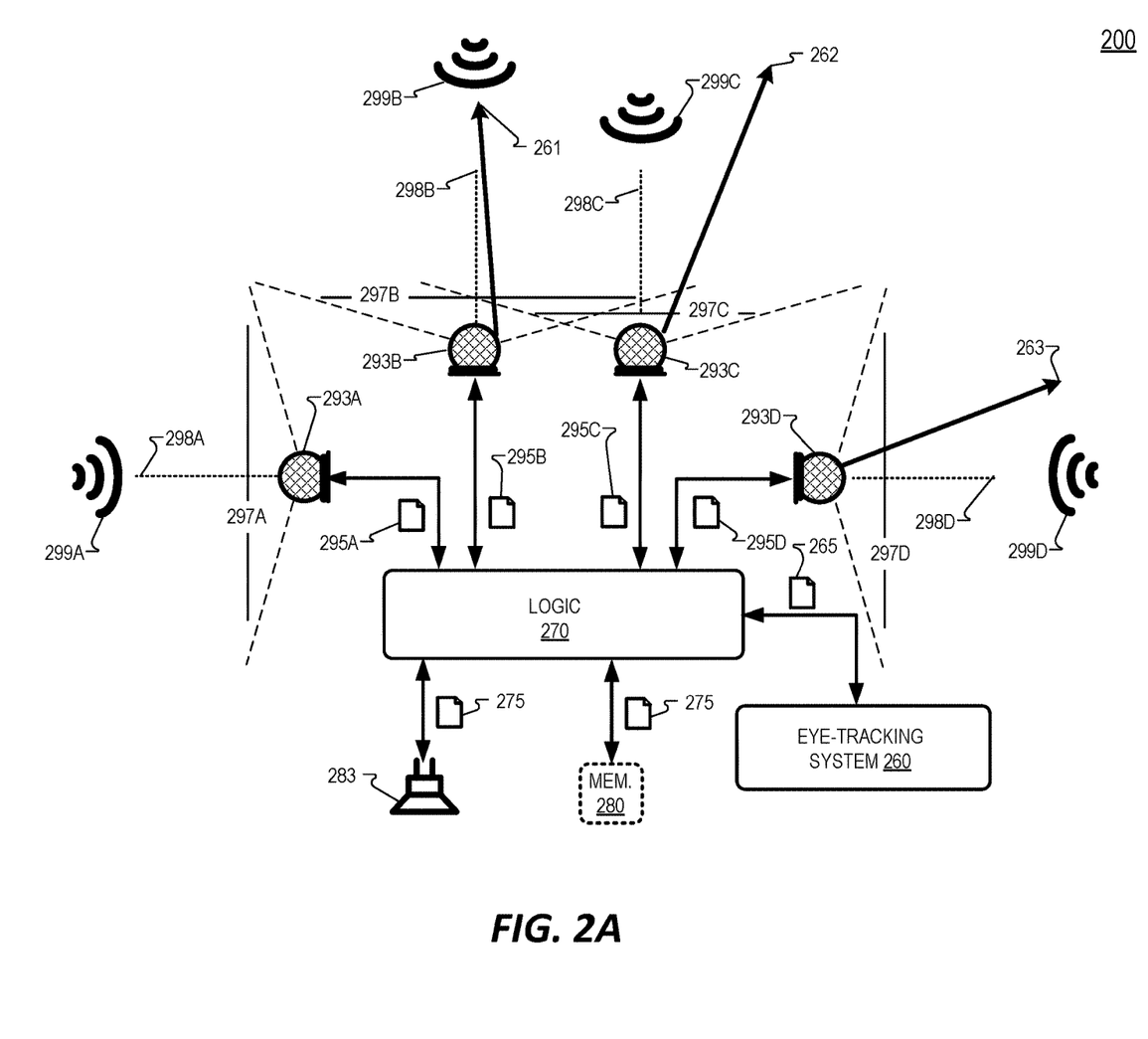
FIG. 2A illustrates an example gaze-guided audio system, in accordance with implementations of the disclosure.

FIG. 2A illustrates an example gaze-guided audio system 200, in accordance with implementations of the disclosure. Gaze-guided audio system 200 may be included in a head mounted device such as head mounted device 100. Gaze-guided audio system 200 includes processing logic 270, memory 280, eye-tracking system 260, and microphones 293A, 293B, 293C, and 293D (collectively referred to as microphones 293). Microphones 293 may be used as microphones 293A-293D. While system 200 illustrates four microphones, other systems may include any integer n number of microphones in a plurality of microphones.

In FIG. 2A, first microphone 293A is configured to record first audio data 295A from first sound waves 299A. First microphone 293A is oriented to receive first sound waves 299A originating from a first audio zone 297A of an external environment of a head mounted device. Axis 298A illustrates a middle of the first audio zone 297A. Axis 298A may correspond to a highest sensitivity for first microphone 293A in that first microphone 293A may record a higher magnitude signal for sound waves propagating along axis 298A compared to the same sound wave propagating to first microphone 293A at a more oblique angle. First microphone 293A is configured to provide first audio data 295A to processing logic 270.

Second microphone 293B is configured to record second audio data 295B from second sound waves 299B. Second microphone 293B is oriented to receive second sound waves 299B originating from a second audio zone 297B of an external environment of a head mounted device. Axis 298B illustrates a middle of the second audio zone 297B. Axis 298B may correspond to a highest sensitivity for second microphone 293B in that second microphone 293B may record a higher magnitude signal for sound waves propagating along axis 298B compared to the same sound wave propagating to second microphone 293B at a more oblique angle. Second microphone 293B is configured to provide second audio data 295B to processing logic 270.

Third microphone 293C is configured to record third audio data 295C from third sound waves 299C. Third microphone 293C is oriented to receive third sound waves 299C originating from a third audio zone 297C of an external environment of a head mounted device. Axis 298C illustrates a middle of the third audio zone 297C. Axis 298C may correspond to a highest sensitivity for third microphone 293C in that third microphone 293C may record a higher magnitude signal for sound waves propagating along axis 298C compared to the same sound wave propagating to third microphone 293C at a more oblique angle. Third microphone 293C is configured to provide third audio data 295C to processing logic 270.

Fourth microphone 293D is configured to record fourth audio data 295D from fourth sound waves 299D. Fourth microphone 293D is oriented to receive fourth sound waves 299D originating from a fourth audio zone 297D of an external environment of a head mounted device. Axis 298D illustrates a middle of the fourth audio zone 297D. Axis 298D may correspond to a highest sensitivity for fourth microphone 293D in that fourth microphone 293D may record a higher magnitude signal for sound waves propagating along axis 298D compared to the same sound wave propagating to fourth microphone 293D at a more oblique angle. Fourth microphone 293D is configured to provide fourth audio data 295D to processing logic 270. The audio zones of the microphones may overlap in some implementations.

Eye-tracking system 260 includes one or more sensors configured to determine a gaze direction of an eye in an eyebox region of a head mounted device. Eye-tracking system 260 may also include digital and/or analog processing logic to assist in determining/calculating the gaze direction of the eye. Any suitable technique may be used to determine a gaze direction of the eye(s). For example, eye-tracking system 260 may include one or more cameras to image the eye(s) to determine a pupil-position of the eye(s) to determine where the eye is gazing. In another example, "glints" reflecting off the cornea (and/or other portions of the eye) are utilized to determine the position of the eye that is then used to determine the gaze direction. Other sensors described in association with FIG. 1 may be used in eye-tracking system 260 such as ultrasound sensors, LIDAR sensors, and/or discrete photodiodes to detect a position of an eye to determine the gaze direction.

Eye-tracking system 260 is configured to generate gaze direction data 265 that includes a gaze direction of the eye(s) and provide gaze direction data 265 to processing logic 270. Gaze direction data 265 may include vergence data representative of a focus distance and a direction of where two eyes are focusing. Processing logic 270 is configured to receive gaze direction data 265 from eye-tracking system 260 and select a primary microphone to record gaze-guided audio based on gaze direction data 265. In the illustrated implementation of FIG. 2A, processing logic 270 generates gaze-guided audio 275 and stores gaze-guided audio 275 to memory 280 and/or drives the gaze-guided audio 275 onto audio transmission device(s) 283. Audio transmission device (s) 283 may include speakers or a bone conduction apparatus, for example. Audio transmission device(s) 283 may be included in a head mounted device. The gaze-guided audio 275 may be driven onto speakers 183A and 183B of head mounted device 100 so that a user/wearer of head mounted device 100 can listen to the gaze-guided audio in real-time. In some implementations, memory 280 is included in processing logic 270.

In an implementation, processing logic 270 selects a primary microphone for recording gaze-guided audio 275 based on the gaze direction included in gaze direction data 265. For example, processing logic 270 may select between two or more microphones as the primary microphone to generate the gaze-guided audio. Selecting the primary microphone to capture gaze-guided audio may be based on the gaze direction (included in gaze direction data 265) with respect to the audio zone of the microphones.

FIG. 2A shows gaze vector 263 illustrating a gaze direction determined by eye-tracking system 260. Since gaze vector 263 is within the audio zone 297D of microphone 293D, processing logic 270 may select microphone 293D as the primary microphone to generate the gaze-guided audio. Selecting microphone 293D to generate the gaze-guided audio may include deselecting the other microphones in the system (in the illustrated example, microphones 293A, 293B, and 293C) so that they are not recording audio or not providing audio data to processing logic 270. In this context, audio data 295D recorded by microphone 293D is the gaze-guided audio 275.

At a subsequent point in time, a gaze direction of the user may change such that gaze vector 262 is representative of a subsequent-gaze direction of subsequent gaze direction data 265. Gaze vector 262 may be included in both audio zone 297B and audio zone 297C. Processing logic 270 may select the microphone where the gaze vector (e.g. gaze vector 262) is closest to a middle of the audio zone of that microphone. In the illustrated example, microphone 293C may be selected by processing logic 270 as the "subsequent-primary microphone" to capture gaze-guided audio since gaze vector 262 is closer to the middle of audio zone 297C (represented by axis 298C) than it is to the middle of audio zone 297D (represented by axis 298D). The subsequent-primary microphone may then generate the gaze-guided audio when a subsequent-gaze vector (gaze vector 262 in the example) becomes closer to a subsequent-selected audio zone (audio zone 297C in the example) of the subsequent-primary microphone that is different from the audio zone (297D) of the primary microphone (microphone 293D in the example).

At yet another point in time, a gaze direction of the user may change such that gaze vector 261 is representative of the gaze direction of gaze direction data 265. Gaze vector 261 may be included in both audio zone 297B and audio zone 297C. Processing logic 270 may select the microphone where the gaze vector (e.g. gaze vector 261) is closest to a middle of the audio zone of that microphone. In the illustrated example, microphone 293B may be selected by processing logic 270 as the primary microphone to capture gaze-guided audio since gaze vector 261 is closer to the middle of audio zone 297B (axis 298B) than it is to the middle of audio zone 297C (axis 298C). In this context, second audio data 295B recorded by microphone 293B is stored in memory 280 as gaze-guided audio 275 and/or driven onto audio transmission devices 283.

Figure 2B:
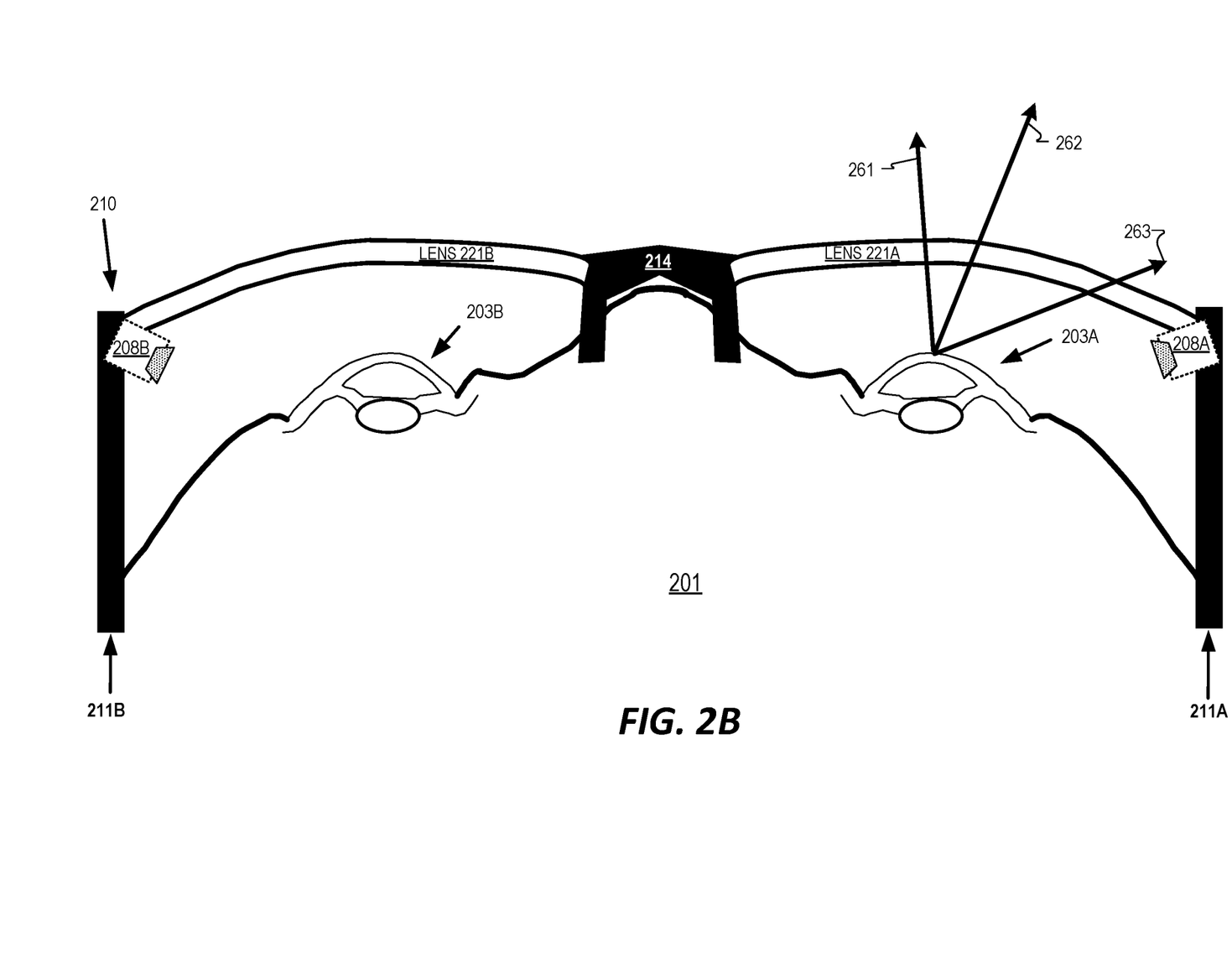
FIG. 2B illustrates a top view of a head mounted device being worn by a user, in accordance with aspects of the disclosure.

FIG. 2B illustrates a top view of a head mounted device 210 being worn by a user 201. The head mounted device 210 includes arms 211A and 211B and nose-piece 214 securing lenses 221A and 221B. Cameras 208A and 208B may be included in an eye-tracking system (e.g. system 260) to generate a gaze direction of eye 203A and/or 203B of user 201 when eye 203A and 203B occupy an eyebox region of head mounted device 210. FIG. 2B illustrates the gaze vectors 261, 262, and 263 of FIG. 2A with respect to a forward-looking resting position of eye 203A. Gaze vectors 261, 262, and 263 may also be generated with respect to both eye 203A and 203B, in some implementations, where the gaze vectors originate from a midpoint between eyes 203A and 203B.

Figure 2C:
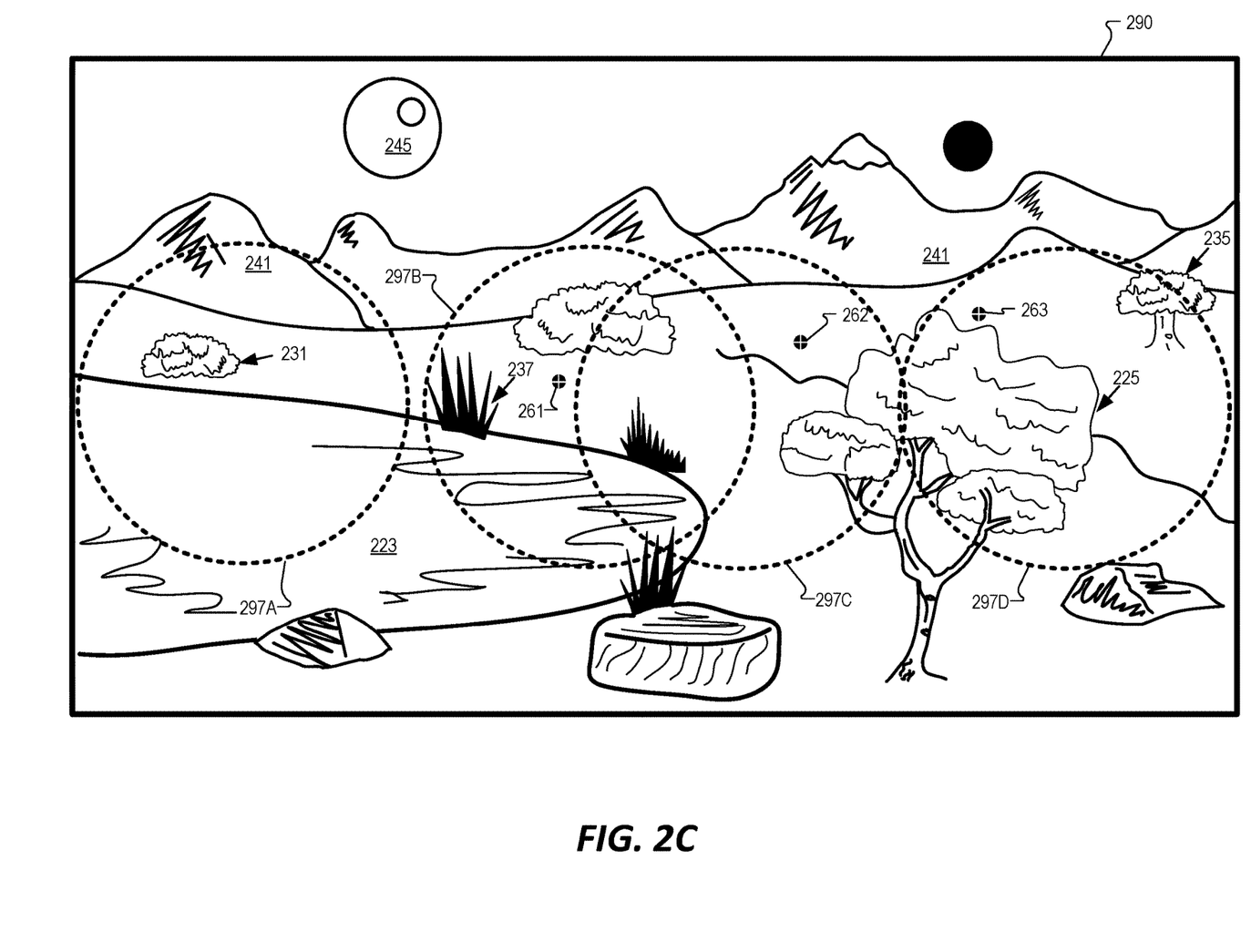
FIG. 2C illustrates an example 270-degree scene of an external environment of a head mounted device, in accordance with aspects of the disclosure.

FIG. 2C illustrates an example 270-degree scene 290 of an external environment of a head mounted device. Scene 290 includes a moon 245, mountains 241, a bush 231, a lake 223, and trees 225 and 235. FIG. 2C illustrates example audio zones 297A, 297B, 297C, and 297D with respect to scene 299. Of course, the illustrated audio zones are merely examples and the audio zones can be rearranged in different implementations to lap or overlap when the orientation of a microphone is changed. In the example of FIG. 2C, the gaze guided audio generated by system 200 may be recorded by microphone 293D as the selected primary microphone when gaze vector 263 (going into the page) is closest to audio zone 297D. In this context, fourth audio data 295D recorded by 293D may be gaze-guided audio 275. Similarly, gaze guided audio generated by system 200 may be recorded by microphone 293C as the selected primary microphone when gaze vector 262 (going into the page) represents the gaze direction of a user of a head mounted device since gaze vector 262 is closest to a middle of audio zone 297C. In this context, third audio data 295C captured by microphone 293C may be the gaze-guided audio 275. And, gaze-guided audio generated by system 200 may be second audio data 295B when gaze vector 261 (going into the page) represents the gaze direction of the user since gaze vector 261 is closest to a middle of audio zone 297B and microphone 293B is selected as the primary microphone.

Figure 2D:
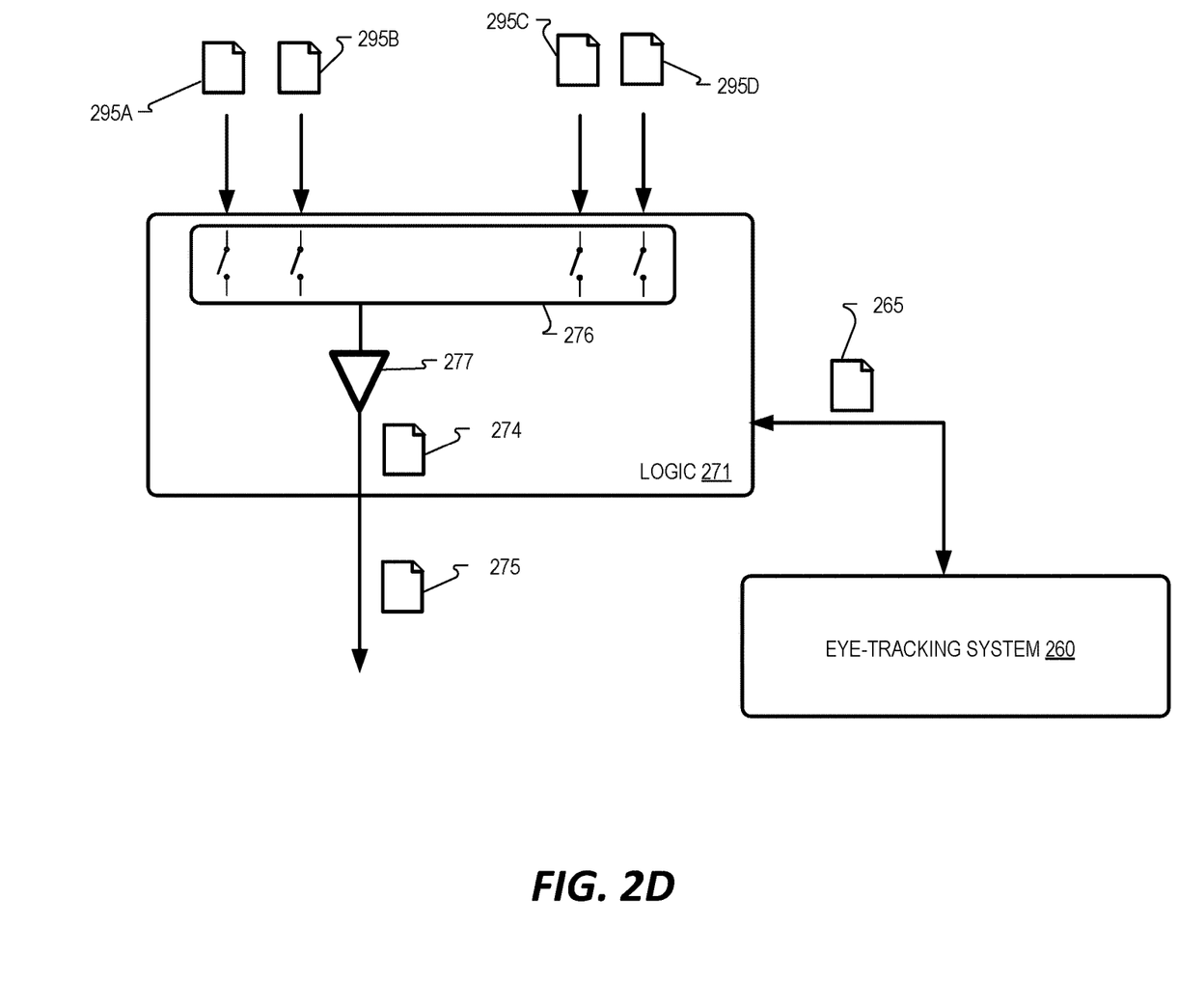
FIG. 2D illustrates an example configuration of processing logic for generating gaze-guided audio, in accordance with aspects of the disclosure.

FIG. 2D illustrates an example configuration of processing logic for generating gaze-guided audio, in accordance with implementations of the disclosure. Processing logic 271 is an example configuration of processing logic 270. Processing logic 271 includes switching logic 276 and amplifier module 277. Switching logic 276 is configured to receive first audio data 295A, second audio data 295B, third audio data 295C, and fourth audio data 295D. Of course, switching logic 276 may be configured to receive audio data from fewer microphones or more microphones in different implementations. Switching logic 276 may be configured to select one of audio data 295 as selected audio data. Switching logic 276 may select audio data 295 in response to receiving gaze direction data 265 from eye-tracking system 260. The selected audio data may correspond with the primary microphone. The selected audio is amplified by amplifier module 277 to generate amplified audio 274. Amplified audio 274 may be outputted by processing logic 271 as the gaze-guided audio 275. Gaze-guided audio 275 may be driven onto audio transmission devices or saved to a memory.

Switching logic 276 may be a combination of analog and digital circuitry. Amplifier module 277 may also be implemented in analog or digital implementations. Processing logic 271 may include analog-to-digital converters (ADC) to convert analog audio data into digital audio data, in some implementations. Additional audio filtering or audio equalizing may be performed on the audio using analog filters or digital filtering. Additionally, noise cancelling techniques may be used in the processing logic in the generation of gaze-guided audio 275.

Figure 3A:
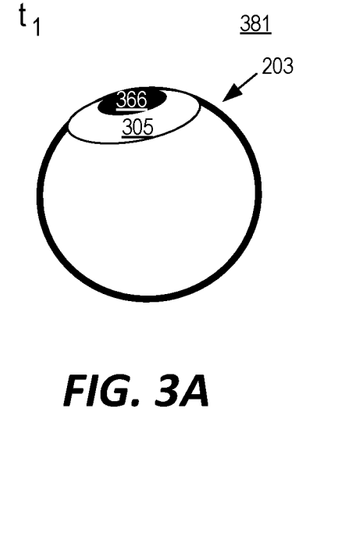
FIGS. 3A-3C illustrate eye positions associated with gaze vectors, in accordance with aspects of the disclosure.
Figure 3B:
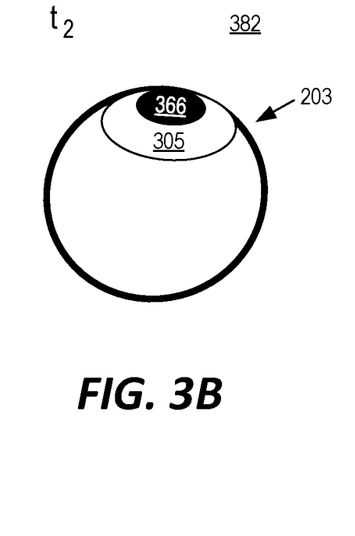
Figure 3C:
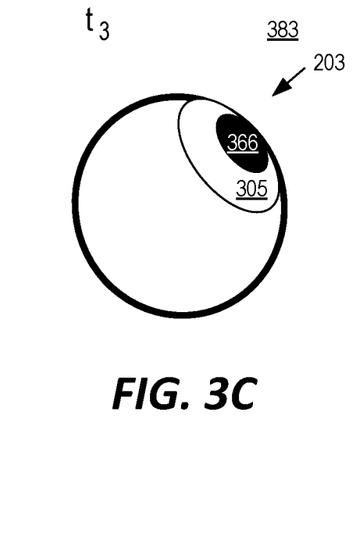

FIGS. 3A-3C illustrate eye positions of eye 203 associated with gaze vectors, in accordance with implementations of the disclosure. At time $t_1$ 381, eye 203 may be positioned as shown in FIG. 3A. The position of eye 203 in FIG. 3A may correspond with gaze vector 261, for example. At a different time $t_2$ 382, eye 203 may be positioned as shown in FIG. 3B. The position of eye 203 in FIG. 3B may correspond with gaze vector 262, for example. And, at time $t_3$ 383, eye 203 may be positioned as shown in FIG. 3C. The position of eye 203 in FIG. 3C may correspond with gaze vector 263, for example. The positions of eye 203 may be measured/determined by a suitable eye-tracking system. The eye-tracking system may determine the position of eye 203 based on a pupil 366 position of eye 203 or based on the position of a cornea 305 of eye 203, for example.

Figure 4:
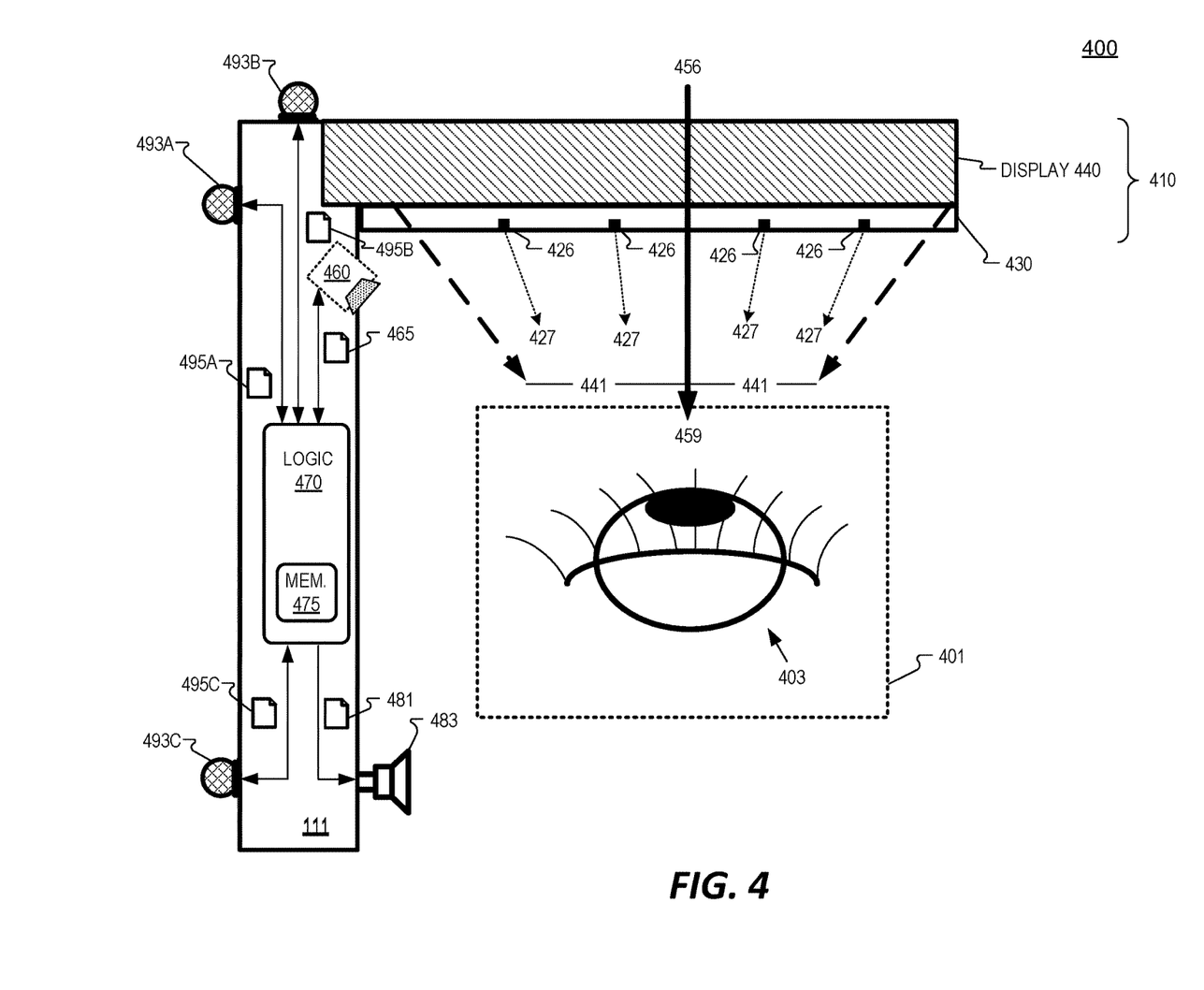
FIG. 4 illustrates a top view of a portion of an example head mounted device, in accordance with aspects of the disclosure.

FIG. 4 illustrates a top view of a portion of an example head mounted device 400, in accordance with implementations of the disclosure. Head mounted device 400 may include a near-eye optical element 410 that includes a display layer 440 and an illumination layer 430. Additional optical layers (not specifically illustrated) may also be included in example optical element 410. For example, a focusing lens layer may optionally be included in optical element 410 to focus scene light 456 and/or virtual images included in image light 441 generated by display layer 440.

Display layer 440 presents virtual images in image light 441 to an eyebox region 401 for viewing by an eye 403. Processing logic 470 is configured to drive virtual images onto display layer 440 to present image light 441 to eyebox region 401. Illumination layer 430 includes light sources 426 configured to illuminate an eyebox region 401 with infrared illumination light 427. Illumination layer 430 may include a transparent refractive material that functions as a substrate for light sources 426. Infrared illumination light 427 may be near-infrared illumination light. Eye-tracking system 460 includes a camera configured to image (directly) eye 403, in the illustrated example of FIG. 4. In other implementations, a camera of eye-tracking system 460 may (indirectly) image eye 403 by receiving reflected infrared illumination light from an optical combiner layer (not illustrated) included in optical element 410. The optical combiner layer may be configured to receive reflected infrared illumination light (the infrared illumination light 427 reflected from eyebox region 401) and redirect the reflected infrared illumination light to the camera of eye-tracking system 460. In this implementation, the camera would be oriented to receive the reflected infrared illumination light from the optical combiner layer of optical element 410.

The camera of eye-tracking system 460 may include a complementary metal-oxide semiconductor (CMOS) image sensor, in some implementations. An infrared filter that receives a narrow-band infrared wavelength may be placed over the image sensor of the camera so it is sensitive to the narrow-band infrared wavelength while rejecting visible light and wavelengths outside the narrow-band. Infrared light sources (e.g. light sources 426) such as infrared LEDs or infrared VCSELS that emit the narrow-band wavelength may be oriented to illuminate eye 403 with the narrow-band infrared wavelength.

In the illustrated implementation of FIG. 4, a memory 475 is included in processing logic 470. In other implementations, memory 475 may be external to processing logic 470. In some implementations, memory 475 is located remotely from processing logic 470. In implementations, virtual image(s) are provided to processing logic 470 for presentation in image light 441. In some implementations, virtual images are stored in memory 475. Processing logic 470 may be configured to receive virtual images from a local memory or the virtual images may be wirelessly transmitted to the head mounted device 400 and received by a wireless interface (not illustrated) of the head mounted device.

FIG. 4 illustrates that processing logic 470 is communicatively coupled to microphones 493A, 493B, and 493C. First microphone 493A generates first audio data 495A, second microphone 493B generates second audio data 495B, and third microphone 493C generates third audio data 495C. Processing logic 470 may select a particular microphone or a plurality of microphones of head mounted device 400 to generate gaze-guided audio in response to gaze direction data 465 received from eye-tracking system 460. Gaze-guided audio 481 may be driven onto one or more audio transmission device(s) 483 that is proximate to an ear of a user/wearer of head mounted device 400. The audio transmission device(s) 483 may be integrated into the head mounted device or be separate devices. In an implementation, driving the gaze-guided audio onto the audio transmission device(s) 483 includes wirelessly transmitting the gaze-guided audio to one or more headphones that are external to the head mounted device. By way of example, a head mounted device may send the gaze-guided audio to ear buds or headphones via a short-range wireless technology.

Figure 5:
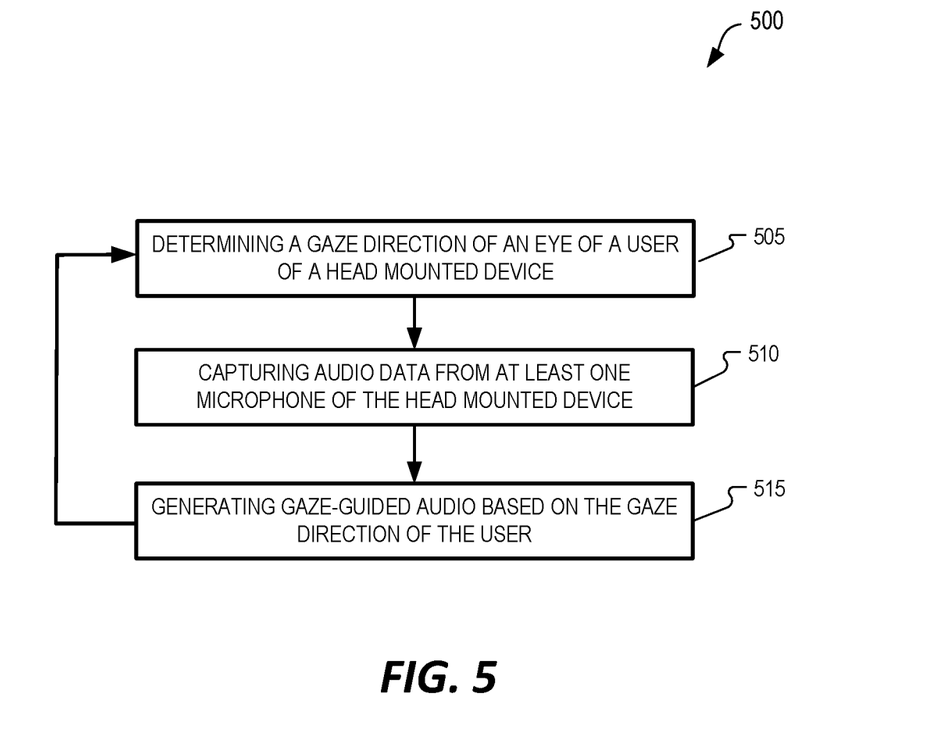
FIG. 5 illustrates a flow chart of an example process of generating gaze-guided audio, in accordance with aspects of the disclosure.

FIG. 5 illustrates a flow chart of an example process 500 of generating gaze-guided audio, in accordance with implementations of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. Processing logic included in a head mounted device may execute all or a portion of the process blocks of process 500. In some implementations, a portion of the process blocks are executed by processing logic that is not included in the head mounted device. For example, a mobile device or another computing device may perform some portions of process 500, in some implementations.

In process block 505, a gaze direction of an eye of a user (of a head mounted device) is determined. The gaze direction may be determined by an eye-tracking system (e.g. eye-tracking system 260 or 460) or by processing logic that receives gaze direction data (e.g. processing logic 270 or 470), for example.

In process block 510, audio data is captured from at least one microphone of the head mounted device.

In process block 515, gaze-guided audio is generated from the audio data based on the gaze direction of the user. Process 500 may return to process block 505 after executing process block 515 to determine a new gaze direction of the eye of user and repeat process 500 to generate gaze-guided audio based on a gaze direction of the user.

Figure 6:
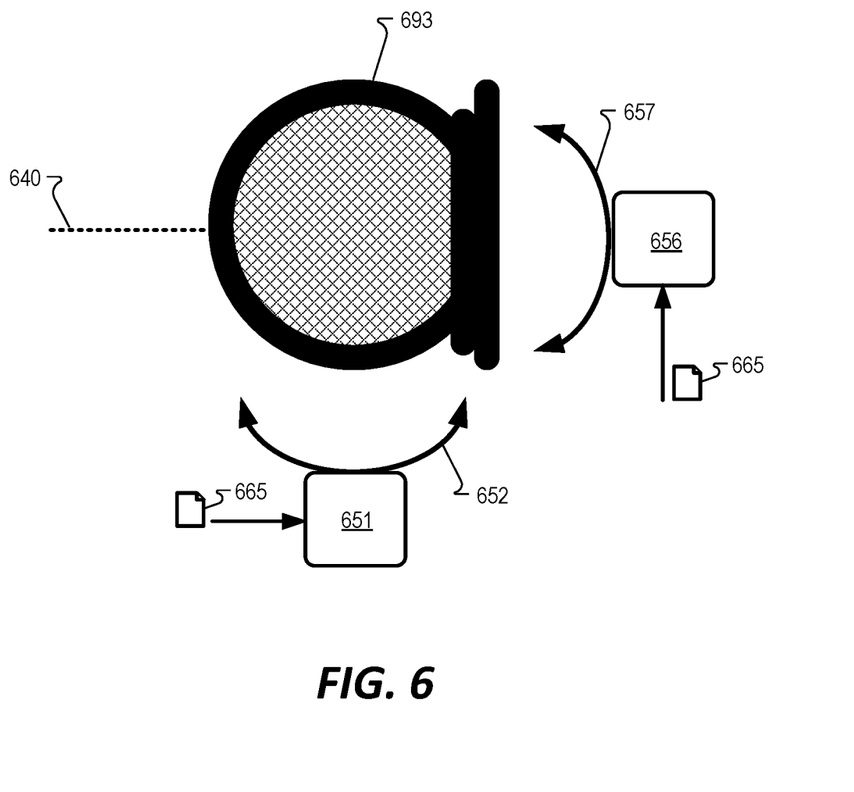
FIG. 6 illustrates a microphone configured to rotate in response to a gaze direction of a user, in accordance with aspects of the disclosure.

In an implementation of process 500, generating the gaze-guided audio include rotating the at least one microphone in response to the gaze direction of the user. FIG. 6 illustrates a microphone configured to rotate in response to a gaze direction of a user, in accordance with implementations of the disclosure. In FIG. 6, rotation module 651 receives gaze direction data 665 (that includes the gaze direction of the user) and rotates at least a portion of microphone 693 in response to gaze direction data 665. Rotation module 651 adjusts microphone 693 along axis 652 in response to gaze direction data 665 so that microphone 693 is pointing where the user is gazing. Thus, microphone 693 may generate gaze-guided audio when axis 640 is pointed to where the user is gazing so that the orientation of microphone 693 is better positioned to receive sound waves originating from where the user is looking.

In an example context, a user of a head mounted device may be looking toward a waterfall that is in a right portion of a field of view (FOV) of a user. The gaze direction of the user (included in gaze direction data 665) can be used to rotate microphone 693 to point toward the waterfall. The audio data recorded by microphone 693 may then be gaze-guided data since microphone 693 was directed/rotated to record sound from the waterfall. The gaze-guided data (e.g. the sound of falling water) from the waterfall can then be provided to the ear of the user/wearer by speakers of the head mounted device. Thus, the user is able to enjoy enhanced listening to sounds generated from where the user is looking.

Rotation module 651 may be implemented as a micro-electro-mechanical system (MEMS), in some implementations. In some implementations, a second rotation module 656 receives gaze direction data 665 (that includes the gaze direction of the user) and rotates at least a portion of microphone 693 in response to gaze direction data 665. Second rotation module 656 would rotate microphone 693 along an axis 657 that is different than axis 652. Axis 652 may be orthogonal to axis 657, in some implementations.

Returning to FIG. 5, in some implementations of process 500, the audio data is recorded by a plurality of microphones of the head mounted device and the microphones in the plurality are directionally oriented to capture the audio data from a plurality of different audio zones of an external environment of the head mounted device. Generating the gaze-guided audio may include amplifying audio from the microphone or microphones in the plurality of microphones that are oriented to receive sound waves from audio zones that correspond with a gaze vector representative of the gaze direction. By way of example, when a user is looking to the right, microphones 193A and/or 193F may be considered oriented to receive sound waves from audio zones corresponding with the user gazing to the right.

In an implementation of process 500, the audio data is recorded by a plurality of microphones and the microphones in the plurality are directionally oriented to capture the audio data from a plurality of different audio zones of an external environment of the head mounted device. Generating the gaze-guided audio from the audio data includes (1) generating amplified audio by amplifying near-audio data received from nearest microphones in the plurality of microphones; and (2) subtracting remaining audio from the amplified audio where the remaining audio is received from remaining microphones in the plurality of microphones that are not included in the nearest microphones. Referring to FIG. 2A for illustration purposes, microphones 293A, 293B, 293C, and 293D may capture audio data from different audio zones 297. If the user gaze is represented by gaze vector 263, microphones 293C and 293D may be identified as "nearest microphones" and therefore audio data 295C and 295D are "near-audio data" that is amplified to generate amplified audio. Microphones 293A and 293B are the remaining microphones since they are in the plurality of microphones 293A, 293B, 293C, and 293D but not "nearest microphones." Thus, audio data 295A and 295B may be "remaining audio." Subtracting the remaining audio from the amplified audio may assist in cancelling or reducing ambient background noise from the amplified audio and thereby isolating the audio of interest that corresponds to gaze vector 263. In some implementations, only one microphone in the plurality is identified as the "nearest microphone" and audio data from the remaining microphones are used for ambient noise cancelling.

In an implementation of process 500, the gaze-guided audio is stored to a memory as an audio portion of a video file that was captured by the head mounted device contemporaneously with the audio data. Referring to FIG. 1 for illustration purposes, camera 198A may capture a video file and gaze-guided audio from microphones 193A and/or 193B may be stored as the audio portion of that video file when a user is gazing to their right. Audio data from microphones 193E and 193D may be less relevant to the video file and therefore not included in the gaze-guided audio, although audio data from microphones 193E and/or 193D may be used for noise-cancelling purposes. This allows the audio portion of the video file to include the audio data that was relevant to where the user was looking while recording the video.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 270, 271 and/or 470) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g. 280 and/or 475) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted device comprising:
   an eye-tracking system including one or more sensors configured to determine a gaze direction of an eye in an eyebox region of the head mounted device;
   a first microphone configured to record first audio data from first sound waves, wherein the first microphone is oriented to receive the first sound waves originating from a first audio zone of an external environment of the head mounted device;
   a second microphone configured to record second audio data from second sound waves, wherein the second microphone is oriented to receive the second sound waves originating from a second audio zone of an external environment of the head mounted device; and
   processing logic configured to:
      receive the gaze direction from the eye-tracking system; and
      select a primary microphone between the first microphone and the second microphone to generate gaze-guided audio, wherein the primary microphone is selected based on the gaze direction received from the eye-tracking system, wherein the primary microphone is selected based in part on a gaze vector representative of the gaze direction being closest to a middle of a selected audio zone of the primary microphone.

2. The head mounted device of claim 1, wherein the processing logic is further configured to:
   receive a subsequent-gaze direction from the eye-tracking system; and
   select a subsequent-primary microphone that is different from the primary microphone when a subsequent-gaze vector representative of the subsequent-gaze direction becomes closer to a subsequent-selected audio zone of the subsequent-primary microphone that is different from an audio zone of the primary microphone.

3. The head mounted device of claim 2, wherein the first microphone is the primary microphone and the second microphone is the subsequent-primary microphone.

4. The head mounted device of claim 1 further comprising audio transmission devices, wherein generating the gaze-guided audio includes:
   generating amplified audio from selected audio data, wherein the first audio data is the selected audio data when the first microphone is selected as the primary microphone, and wherein the second audio data is the selected audio data when the second microphone is selected as the primary microphone; and
   driving the amplified audio onto the audio transmission devices as the gaze-guided audio.

5. The head mounted device of claim 4, wherein generating the amplified audio from the selected audio data includes subtracting unselected audio data from the amplified audio.

6. The head mounted device of claim 1 further comprising audio transmission devices, wherein generating the gaze-guided audio includes:
   generating amplified audio from selected audio data, wherein the first audio data is the selected audio data when the first microphone is selected as the primary microphone, and wherein the second audio data is the selected audio data when the second microphone is selected as the primary microphone; and storing the amplified audio to memory as the gaze-guided audio.

7. The head mounted device of claim 6, wherein the amplified audio stored to memory is stored as an audio portion of a video file.

8. A head mounted device comprising:

an eye-tracking system including one or more sensors configured to determine a gaze direction of an eye in an eyebox region of the head mounted device;

a first microphone configured to record first audio data from first sound waves, wherein the first microphone is oriented to receive the first sound waves originating from a first audio zone of an external environment of the head mounted device;

a second microphone configured to record second audio data from second sound waves, wherein the second microphone is oriented to receive the second sound waves originating from a second audio zone of an external environment of the head mounted device; and processing logic configured to:

receive the gaze direction from the eye-tracking system;

select a primary microphone between the first microphone and the second microphone to generate gaze-guided audio, wherein the primary microphone is selected based on the gaze direction received from the eye-tracking system;

receive a subsequent-gaze direction from the eye-tracking system; and select a subsequent-primary microphone that is different from the primary microphone when a subsequent-gaze vector representative of the subsequent-gaze direction becomes closer to a subsequent-selected audio zone of the subsequent-primary microphone that is different from an audio zone of the primary microphone.

9. The head mounted device of claim 8, wherein the first microphone is the primary microphone and the second microphone is the subsequent-primary microphone.

10. The head mounted device of claim 8, wherein the primary microphone is selected based in part on a gaze vector representative of the gaze direction being closest to a middle of a selected audio zone of the primary microphone.

11. The head mounted device of claim 8 further comprising:

speakers, wherein the processing logic is further configured to drive the gaze-guided audio onto the speakers.

12. The head mounted device of claim 8 further comprising:

memory, wherein the processing logic is further configured to store the gaze-guided audio to the memory as an audio portion of a video file that was captured by the head mounted device contemporaneously with the audio data.

13. The head mounted device of claim 8, wherein generating the gaze-guided audio includes amplifying audio from one or more microphones that are oriented to receive sound waves from audio zones that correspond with a gaze vector representative of the gaze direction.

14. The head mounted device of claim 8, wherein generating the gaze-guided audio includes:

generating amplified audio by amplifying near-audio data received from a nearest microphone in a plurality of microphones; and subtracting remaining audio from the amplified audio, wherein the remaining audio is received from remaining microphones in the plurality of microphones that are not included in the nearest microphones.

* * * * *